United States Patent
Karman et al.

(10) Patent No.: US 10,977,051 B1
(45) Date of Patent: Apr. 13, 2021

(54) DYNAMIC BASE ADDRESS REGISTER (BAR) RECONFIGURATION USING A PERIPHERAL COMPONENT INTERCONNECT EXPRESS (PCIE) EXTENDED CONFIGURATION SPACE

(71) Applicant: XILINX, INC., San Jose, CA (US)

(72) Inventors: Christopher Y. Karman, Frederick, CO (US); Vidya Gopalakrishnan, San Jose, CA (US); Ramesh Barukula, Hyderabad (IN)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/678,501

(22) Filed: Nov. 8, 2019

(51) Int. Cl.
*G06F 9/4401* (2018.01)
*G06F 13/42* (2006.01)
*G06F 9/445* (2018.01)

(52) U.S. Cl.
CPC ........ *G06F 9/4411* (2013.01); *G06F 13/4282* (2013.01); *G06F 9/44505* (2013.01); *G06F 2213/0026* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,694,025 B1 * | 4/2010 | Norrie | ..................... | G06F 3/007 710/3 |
| 8,806,098 B1 * | 8/2014 | Mandapuram | ........ | G06F 13/404 710/104 |
| 2008/0294825 A1 * | 11/2008 | Mahalingam | ......... | G06F 9/4812 710/262 |
| 2016/0147551 A1 * | 5/2016 | Tsirkin | ................ | G06F 9/45545 718/1 |
| 2016/0162436 A1 * | 6/2016 | Raghavan | ............... | G06F 13/28 710/308 |
| 2019/0132198 A1 * | 5/2019 | Li | .......................... | G06F 12/023 |

OTHER PUBLICATIONS

Xilinx, Inc., "UltraScale+ Devices Integrated Block for PCI Express v1.3", Product Guide, Vivado Design Suite, PG213 (v1.3) Jun. 24, 2019, San Jose, CA USA.

* cited by examiner

*Primary Examiner* — Raymond N Phan
(74) *Attorney, Agent, or Firm* — Patterson + Sheridan, LLP (57) ABSTRACT

Some examples described herein provide for dynamically reconfiguring a base address register (BAR) of a Peripheral Component Interconnect Express (PCIe) configuration space. In an example, information relating to a BAR of a PCIe configuration space is written to a PCIe extended configuration space of the PCIe configuration space, which is read, by a dynamic BAR module. Respective values are written, by the dynamic BAR module, to bits of the BAR based on the information. After writing by the dynamic BAR module, a set value is attempted to be written to each of address bits of the BAR. Writing the set value to an address bit of the BAR is prevented when the address bit is set to a predefined value. After attempting to write, a read value is read from the bits of the BAR. A base address of memory is written to the BAR based on the read value.

20 Claims, 4 Drawing Sheets

DYNAMIC BASE ADDRESS REGISTER (BAR) RECONFIGURATION USING A PERIPHERAL COMPONENT INTERCONNECT EXPRESS (PCIE) EXTENDED CONFIGURATION SPACE

TECHNICAL FIELD

Examples of the present disclosure generally relate to dynamically reconfiguring a base address register (BAR) of a Peripheral Component Interconnect Express (PCIe) configuration space and, in particular, to methods and devices in which a BAR is dynamically reconfigured.

BACKGROUND

Peripheral Component Interconnect Express (PCIe) is a high-speed serial expansion bus standard. PCIe is based on point-to-point topology, with separate serial links connecting devices to the root complex (e.g., host). A PCIe bus link can support full-duplex communication between any two endpoints, with no inherent limitation on concurrent access across multiple endpoints. PCIe devices communicate via a logical connection called an interconnect or link. A link is a point-to-point communication channel between two PCIe ports allowing both ports to send and receive PCI requests (e.g., configuration, I/O or memory read/write) and interrupts. At the physical level, a link is composed of one or more lanes.

SUMMARY

Some examples described herein provide for dynamically reconfiguring a base address register (BAR) of a Peripheral Component Interconnect Express (PCIe) configuration space. Some examples described herein provide a dynamic BAR module that is configured to poll a PCIe extended configuration space interface to determine when a host writes to one or more registers of a PCIe extended configuration space of a PCIe configuration space and responsively writes to one or more BARs of the PCIe configuration space based on information written to the one or more registers.

An example of the present disclosure is a method for reconfiguring a PCIe communication environment. Information relating to a BAR of a PCIe configuration space is written to a PCIe extended configuration space of the PCIe configuration space. The information is read, by a dynamic BAR module, from the PCIe extended configuration space. Respective values are written, by the dynamic BAR module, to bits of the BAR based on the information read by the dynamic BAR module. After writing by the dynamic BAR module, a set value is attempted to be written to each of address bits of the BAR. Writing the set value to a respective address bit of the BAR is prevented when the respective address bit is set to a predefined value. After attempting to write, a read value is read from the bits of the BAR. A base address of memory is written to the BAR based on the read value.

Another example of the present disclosure is a device for communicating in a PCIe environment. The device includes a PCIe configuration space and a dynamic BAR module. The PCIe configuration space includes a BAR and a PCIe extended configuration space. The dynamic BAR module includes logic configured to read information written to the PCIe extended configuration space and to write respective values to bits of the BAR in response to the read information.

Another example of the present disclosure a non-transitory storage medium storing a representation of a dynamic BAR module. The dynamic BAR module is to be implemented on a programmable logic device. The dynamic BAR module includes logic configured to: (i) read information written to one or more registers of a PCIe extended configuration space of a PCIe configuration space, the PCIe configuration space being in a PCIe hardblock; and (ii) write respective values to bits of a BAR of the PCIe configuration space in response to the read information.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Some examples described herein provide for dynamically reconfiguring a base address register (BAR) of a Peripheral Component Interconnect Express (PCIe) configuration space. Some examples described herein provide a dynamic BAR module that is configured to poll a PCIe extended configuration space interface to determine when a host writes to a register(s) of a PCIe extended configuration space of a PCIe configuration space. The dynamic BAR module responsively writes to a BAR(s) of the PCIe configuration space based on information written to the register(s), which can result in conversion of the information to a BAR reconfiguration in the PCIe configuration space.

The host may write to the register(s) of the PCIe extended configuration space to indicate that a BAR(s) is to be reconfigured, such as by enabling or disabling BAR(s), changing an address bit size (e.g., by concatenating or de-concatenating BARs), and/or changing a memory aperture size for BAR(s)). The dynamic BAR module polls the PCIe extended configuration space interface to determine when the host has written to the register(s), and when the dynamic BAR module determines that the host has written to the register(s), the dynamic BAR module reads the information written to the register(s). The dynamic BAR module writes values to a BAR(s) based on the read information. The host can then perform a re-enumeration process to allocate memory for the BAR(s) and write respective base addresses of the memory to the BAR(s).

Some examples can therefore allow memory to be dynamically allocated or reallocated for use in a PCIe environment. The dynamic allocation or reallocation of memory can be triggered by changing conditions of an endpoint device, such as by changing utilization of memory or a change in endpoint device (e.g., by a partial reconfiguration in a programmable logic device). Dynamically reconfiguring a BAR as described in examples herein can permit a PCIe communication link to be maintained during reconfiguring one or more BARs. This can obviate link training that may otherwise occur if, e.g., the PCIe configuration space is completely reconfigured. Generally, if a PCIe configuration space is completely configured, a link training step is performed, such as during a boot sequence, to enable a PCIe communication link. However, some examples can obviate performing a link training, such as by having to re-boot the host, after reconfiguring a BAR. Additionally, for programmable logic devices, such as a field programmable gate array (FPGA), examples can permit changing and reallocating memory, and reconfiguring a BAR, without having to reconfigure, e.g., the PCIe hardblock of the programmable logic device. Other benefits may be achieved.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described. Further, methods described herein may be described in a particular order of operations, but other methods according to other examples may be implemented in various other orders (e.g., including different serial or parallel performance of various operations) with more or fewer operations.

Figure 1:
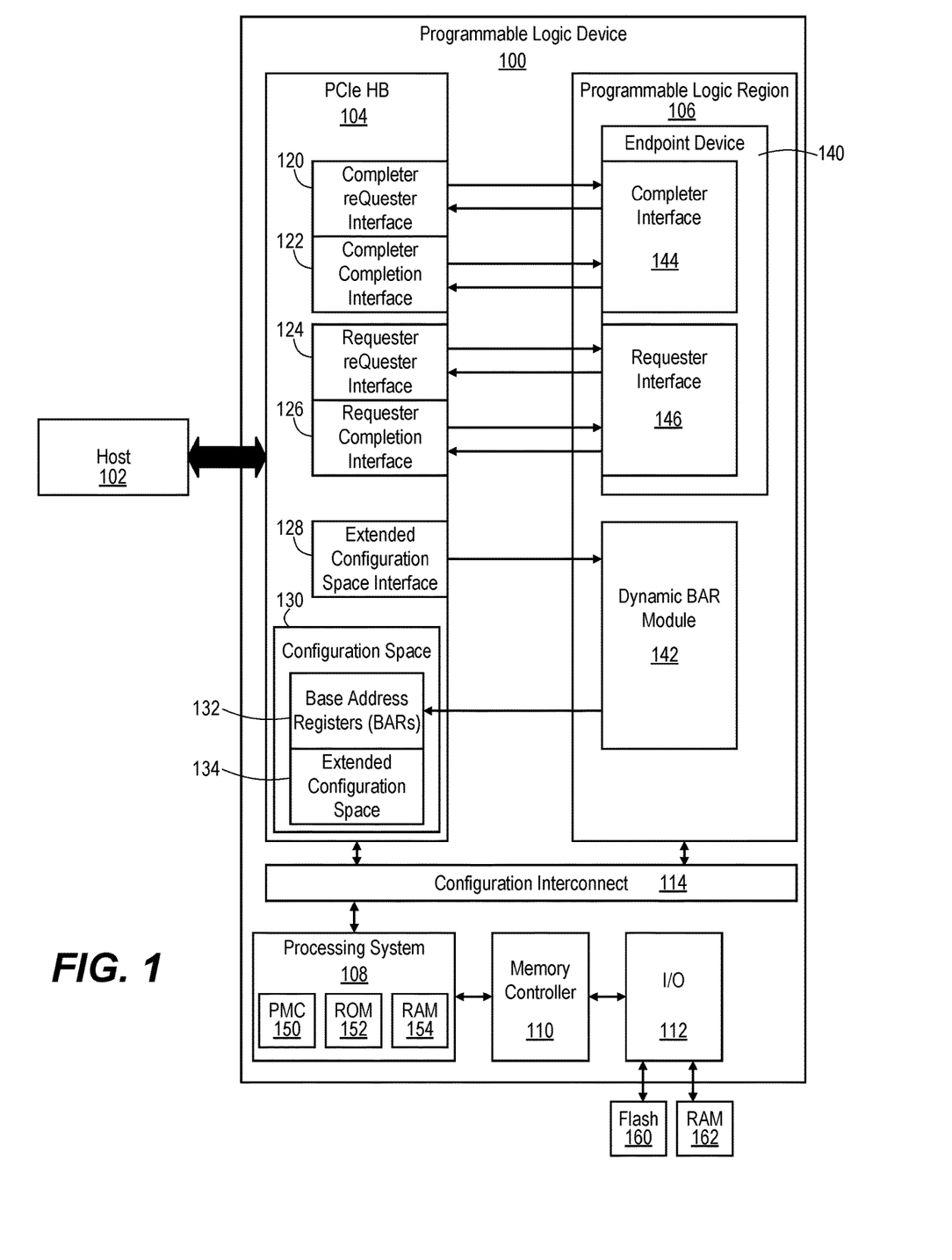
FIG. 1 depicts a programmable logic device implemented in a Peripheral Component Interconnect Express (PCIe) environment with a host according to some examples.

FIG. 1 illustrates a programmable logic device 100 implemented in a PCIe environment with a host 102 according to some examples. The programmable logic device 100 can be or include any programmable logic device, such as a FPGA, a complex programmable logic device (CPLD), or the like. The programmable logic device 100 can be or include one or more integrated circuits (ICs) on respective chips or dice. In some examples, the programmable logic device 100 can further be or include a System-on-Chip (SoC) that includes multiple distinct systems. In some examples, the programmable logic device 100 can be implemented by multiple chips, e.g., in an active die-on-active die stacked configuration or an active die-by-active die on an interposer configuration.

The programmable logic device 100 includes a PCIe hardblock 104, one or more programmable logic region 106, a processing system 108, one or more memory controllers 110, one or more input/output (I/O) blocks 112, and a configuration interconnect 114. The programmable logic device 100 can include other subsystems (such as a Network-on-Chip (NoC) for communications between the various blocks and subsystems) and/or can include a number of other communication mechanisms coupled between the various blocks and subsystems. FIG. 1 is provided as a simplified example of a programmable logic device so as to not obscure aspects described herein.

The PCIe hardblock 104 is a hardened circuit configured to enable PCIe communications. The PCIe hardblock 104 is configured to process communications at a physical layer, a data link layer, and a transaction layer. The PCIe hardblock 104 includes a Completer reQuester (CQ) interface 120, a Completer Completion (CC) interface 122, a Requester reQuester (RQ) interface 124, a Requester Completion (RC) interface 126, a PCIe extended configuration space interface 128, and a PCIe configuration space 130. The CQ interface 120, CC interface 122, RQ interface 124, and RC interface 126 include hardened logic to implement request and completion communications between an endpoint device and the host 102, with each being operable as a requester and a completer. Additional details of these interfaces are described subsequently. The PCIe configuration space 130 includes, among other things, base address registers (BARs) 132 and a PCIe extended configuration space 134. The PCIe configuration space 130 can be implemented by a memory space and/or registers in the PCIe hardblock 104. The structure of the PCIe configuration space 130 can generally be according to the PCIe base standard (e.g., any applicable version thereof), which can indicate the various components and offsets for the PCIe configuration space 130.

Figure 2:
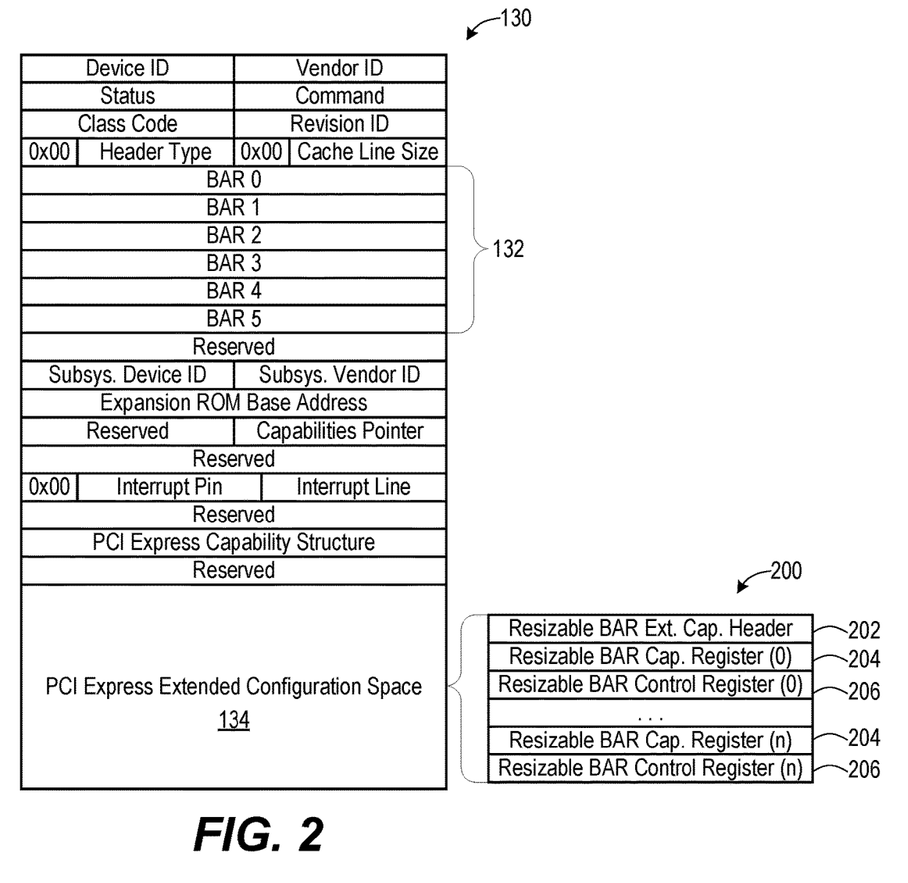
FIG. 2 depicts a PCIe configuration space according to some examples.

FIG. 2 illustrates the PCIe configuration space 130 according to some examples. Much of the PCIe configuration space 130 is well understood by a person having ordinary skill in the art, and hence, description here is omitted. The PCIe configuration space 130 includes BARs 132 (e.g., BAR 0 through BAR 5) and the PCIe extended configuration space 134. Among other possible capabilities registers that may be implemented in the PCIe extended configuration space 134, the PCIe extended configuration space 134 includes resizable BAR extended capabilities registers 200.

The resizable BAR extended capabilities registers 200 can have any structure, and the illustration in FIG. 2 is simply an example. Generally, the resizable BAR extended capabilities registers 200 are writable by the host 102 to indicate when and how one or more of the BARs 132 are to be reconfigured or reprogrammed. The resizable BAR extended capabilities registers 200 include a resizable BAR extended capabilities header 202 and n+1 number of resizable BAR capabilities registers 204 and resizable BAR control registers 206.

The resizable BAR extended capabilities header 202 can indicate, e.g., an offset in the resizable BAR extended capabilities registers 200 for any given resizable BAR capabilities register 204 and/or resizable BAR control register 206, how may resizable BAR capabilities registers 204 and/or resizable BAR control registers 206 are implemented in the resizable BAR extended capabilities registers 200, and/or any other applicable information. Each pair of resizable BAR capabilities register 204 and resizable BAR control register 206 can be tightly coupled to indicate information regarding a BAR 132. The resizable BAR capabilities register 204 can be a register that is writeable to indicate a memory aperture size to be written to a BAR 132 when the BAR 132 is enabled. The format to be written to the resizable BAR capabilities register 204 can match the format of what is to be written to the BAR 132 to indicate in the BAR 132 the memory aperture size or can be any other format that can indicate the memory aperture size (e.g., by decoding logic). The corresponding resizable BAR control register 206 can indicate which BAR 132 is to be written, whether to BAR 132 is to be enabled or disabled, the memory bit address size (e.g., whether the BAR 132 and a subsequent BAR 132 are to be concatenated) when enabled, and/or any other relevant information. In some examples, each pair of the resizable BAR capabilities register 204 and resizable BAR control register 206 can be implemented as a single register or can be implemented as more registers.

Referring back to FIG. 1, the PCIe extended configuration space interface 128 includes hardened logic capable of making data or information written to the PCIe extended configuration space 134 available to another circuit or system. The PCIe extended configuration space interface 128 can provide an indication of when data written to the PCIe extended configuration space 134 has changed and/or can permit other circuit(s) or system(s) to poll the PCIe extended configuration space 134. The other circuit(s) or system(s) can read the data or information written to the PCIe extended configuration space 134 via the PCIe extended configuration space interface 128. More particularly, the PCIe extended configuration space interface 128 can provide an indication of when data or information written to the resizable BAR extended capabilities registers 200 has changed and/or can permit other circuit(s) or system(s) to poll the resizable BAR extended capabilities registers 200. The other circuit(s) or system(s) can read the data or information written to the resizable BAR extended capabilities registers 200 via the PCIe extended configuration space interface 128.

The programmable logic region 106 is logic circuitry that may be programmed to perform specified functions. The programmable logic region 106 can include any number or arrangement of programmable tiles. As an example, the programmable logic region 106 may be implemented as fabric of an FPGA. For example, the programmable logic region 106 can include any number of configurable logic blocks (CLBs), look-up tables (LUTs), digital signal processing blocks (DSPs), random access memory blocks (BRAMs), etc. Each of the programmable tiles (e.g., CLBs, LUTs, DSPs, BRAMs, etc.) can include one or more programmable interconnect elements. The various respective types of programmable tiles can be arranged in rows and/or columns, and the associate programmable interconnect elements can be connected to neighboring programmable logic elements in a same column and row, for example. The programmable interconnect element can form an interconnect network of the programmable logic region 106. Any logic and connections can be implemented by the programmable logic region 106 by programming or configuring any of the programmable tiles of the programmable logic region 106.

As illustrated in FIG. 1, an endpoint device 140 and a dynamic BAR module 142 are or include logic instantiated on the programmable logic region 106. The endpoint device 140 includes a completer interface 144 and a requester interface 146. The endpoint device 140 can be or include any logic to implement any application or user design. The completer interface 144 is communicatively coupled to the CQ interface 120 and CC interface 122 of the PCIe hardblock 104. The requester interface 146 is communicatively coupled to the RQ interface 124 and RC interface 126 of the PCIe hardblock 104. The mechanism(s) by which the completer interface 144 and requester interface 146 are communicatively coupled to the CQ interface 120, CC interface 122, RQ interface 124, and RC interface 126 can vary. For example, the completer interface 144 and requester interface 146 can be communicatively coupled to the CQ interface 120, CC interface 122, RQ interface 124, and RC interface 126 via direct connections, configurable transmission connections, a static routing network, and/or a configurable routing network (e.g., a configurable network of a Network-on-Chip (NoC)) between the PCIe hardblock 104 and the interconnect network of the programmable logic region 106. The interconnect network of the programmable logic region 106 can route communications in the programmable logic region 106 to or from the completer interface 144 or requester interface 146.

The CQ interface 120 is configured to transmit request messages (e.g., transaction layer packet (TLP) request messages) generated by and received from, e.g., the host 102 to the endpoint device 140, and the completer interface 144 is configured to receive the request messages from the CQ interface 120. The endpoint device 140 is configured to complete the request and to respond accordingly. The completer interface 144 is further configured to transmit completion messages (e.g., transaction layer packet (TLP) completion messages) generated by the endpoint device 140 to the PCIe hardblock 104, and the CC interface 122 is configured to receive the completion messages from the completer interface 144. The PCIe hardblock 104 is configured to process the completion messages and communicate the completion messages to, e.g., the host 102. The CQ interface 120 and CC interface 122 may be further communicatively coupled to the completer interface 144 to send and/or receive various other signals ancillary to and/or that enable communication of request and completion messages therebetween.

The endpoint device 140 can generate a request message. The requester interface 146 is configured to transmit request messages (e.g., transaction layer packet (TLP) request messages) generated by the endpoint device 140 to the PCIe hardblock 104, and the RQ interface 124 is configured to receive the request messages from the requester interface 146. The PCIe hardblock 104 is configured to process the request messages and communicate the request messages to, e.g., the host 102. The devices that receives the request messages (e.g., the host 102) generates a completion message that is communicated to the PCIe hardblock 104. The PCIe hardblock 104 is configured to process the request and completion messages. The RC interface 126 is configured to transmit completion messages (e.g., transaction layer packet (TLP) completion messages) received from, e.g., the host 102 to the endpoint device 140, and the requester interface 146 is configured to receive the completion messages from the RC interface 126. The RQ interface 124 and RC interface 126 may be further communicatively coupled to the requester interface 146 to send and/or receive various other signals ancillary to and/or that enable communication of request and completion messages therebetween.

The dynamic BAR module 142 is configured to poll the PCIe extended configuration space interface 128, including the resizable BAR extended capabilities registers 200. When a change to the resizable BAR extended capabilities registers 200 is indicated, the dynamic BAR module 142 is configured to responsively read the data or information written to the resizable BAR extended capabilities registers 200 and write to appropriate ones of the BARs 132 based on the data or information read from the resizable BAR extended capabilities registers 200. Additional details of the operation of the dynamic BAR module 142 are described below.

The processing system 108 may be or include any of a variety of different processor types and number of processor cores. For example, the processing system 108 may be implemented as an individual processor, e.g., a single core capable of executing program instruction code. In another example, the processing system 108 may be implemented as a multi-core processor. The processing system 108 may be implemented using any of a variety of different types of architectures. Example architectures that may be used to implement the processing system 108 may include an ARM processor architecture, an x86 processor architecture, a graphics processing unit (GPU) architecture, a mobile processor architecture, a digital signal processor (DSP) architecture, or other suitable architecture that is capable of executing computer-readable program instruction code.

The processing system 108 includes a platform management controller (PMC) 150, which may be a processor and/or processor core in the processing system 108 capable of executing program instruction code. The processing system 108 includes read-only memory (ROM) 152 (e.g., programmable ROM (PROM) such as eFuses, or any other ROM) and random access memory (RAM) 154 (e.g., static RAM (SRAM) or any other RAM). The ROM 152 stores program instruction code that the PMC 150 is capable of executing in a boot sequence. The RAM 154 is capable of being written to (e.g., to store program instruction code or data) by the PMC 150 executing program instruction code from the ROM 152 during the boot sequence, and the PMC 150 is capable of executing program instruction code stored in the RAM 154 during later operations of the boot sequence.

The processing system 108 is communicatively coupled to one or more memory controllers 110, which are communicatively coupled to respective I/O blocks 112. The memory controller(s) 110 can be double data rate (DDR) memory controllers, high bandwidth memory (HBM) memory controllers, or the like. The I/O block(s) 112 can be a HBM interface, eXtreme Performance Input/Output (XPIO), multi-gigabit transceivers (MGTs), or any other input/output blocks. Any of the memory controller(s) 110 and/or I/O block(s) 112 can be programmable. The processing system 108 can be communicatively coupled to the memory controller(s) 110 by direct connection and/or via another interconnect or network (e.g., via a configurable network of a NoC). The memory controller(s) 110 can be communicatively coupled to respective I/O block(s) 112 by direction connection and/or via another interconnect or network. The I/O block(s) 112 can also be communicatively connected to the processing system 108 via an interconnect and/or network (e.g., a configurable network of a NoC) (not specifically illustrated).

The I/O block(s) 112 are communicatively coupled to flash memory 160 and to RAM 162 (e.g., DDR dynamic RAM (DDRDRAM)). The flash memory 160 and RAM 162 may be separate chips and located, e.g., on a same board (e.g., evaluation board) as the programmable logic device 100. The PMC 150 is capable of reading data from the flash memory 160 via the memory controller 110 and I/O block 112, and writing the read data to local RAM 154 and/or, via the memory controller 110 and I/O block 112, to the RAM 162.

The processing system 108 is further communicatively coupled to the programmable logic region 106 and the PCIe hardblock 104 via the configuration interconnect 114. The processing system 108 is configured to communicate configuration data to the programmable logic region 106 and the PCIe hardblock 104 through the configuration interconnect 114. The configuration interconnect 114 can be one or multiple distinct delivery mechanisms for configuration data. For example, the configuration interconnect 114 can include a configuration Frame (CFRAME) interconnect for communicating and delivering a bitstream to the programmable logic region 106, and can include a peripheral interconnect (e.g., a peripheral interconnect of a NoC) for communicating and delivering configuration data or binaries to the PCIe hardblock 104 (and possibly to other programmable blocks, such as the memory controller(s) 110, I/O block(s) 112, configurable network of the NoC, and/or the like).

An endpoint device 140 can be instantiated in the programmable logic region 106 and a PCIe communication link can be established between the host 102 and the endpoint device 140 by a boot sequence. The host 102 can include memory and a processor, where the memory includes instruction code for an operating system that is executed by the processor of the host 102. The instruction code for the operating system includes instruction code for a host boot sequence. The programmable logic device 100 includes instruction code stored in the ROM 152 for a device boot sequence, and that instruction code is executed by the PMC 150. The flash memory 160 stores, e.g., a boot image file that includes a platform loader and manager (PLM) and an initial configuration of the programmable logic region 106, PCIe hardblock 104, and any other programmable block.

At boot time, the host 102 begins executing the host boot sequence, and the PMC 150 begins executing the device boot sequence. The PMC 150 accesses the instruction code for the device boot sequence from the ROM 152 and executes that instruction code. The execution of the device boot sequence causes the PMC 150 to access the boot image file from the flash memory 160 via a memory controller 110 and I/O block 112. The PMC 150 reads the PLM from the boot image file and stores the PLM in the RAM 154. The PMC 150 then transitions to executing the PLM that is stored in the RAM 154, which causes the PMC 150 to continue reading the boot image file from the flash memory 160 to access configuration data (e.g., bitstreams and binaries). The PMC 150 executing the PLM then causes the configuration data to be transmitted to the appropriate programmable blocks to program or configure those blocks. The PMC 150 may store the configuration data in, e.g., RAM 162 and/or RAM 154 at various steps during processing the boot image file.

Transmitting the configuration data of the boot image file to the programmable blocks can cause the programmable logic device to be configured according to an initial user design or application. Configuration data (e.g., a bitstream) can be transmitted to the programmable logic region 106 from the PMC 150 via the configuration interconnect 114 (e.g., a CFRAME interconnect) to instantiate an initial endpoint device 140 and the dynamic BAR module 142 on the programmable logic region 106. Configuration data can be transmitted to the PCIe hardblock 104 from the PMC 150 via the configuration interconnect 114 (e.g., via a peripheral interconnect of a NoC) to configure the PCIe hardblock 104, including writing to BARs 132 to enable/disable the BARs, to indicate a memory address bit size, and/or to indicate respective memory aperture sizes for the initial endpoint device 140. Configuring the PCIe hardblock 104 includes writing a logical "0" (or simply, "0" herein) to various bits of BARs 132 that are to be enabled to indicate respective memory aperture sizes, as described in more detail below. Configuration data can be communicated from the PMC 150 to other blocks or systems, e.g., to configure communication interconnects and channels between various components.

After the PCIe hardblock 104 is configured, link training and enumeration of the initial endpoint device 140 by the host 102 is performed. The enumeration process includes the host 102 attempting to write a logical "1" (or simply, "1" herein) to bits of the BARs 132, but such writing to a bit of a BAR 132 is prevented by any "0" written to that bit during the configuration of the PCIe hardblock 104. The host 102 reads back the values written to the BARs 132. For each BAR 132, the host 102 clears the lower four bits of the read value of a respective BAR 132 (e.g., which are control/reserved bits), inverts the read value, and adds one to the inverted value. The resulting values indicate respective sizes of the memory apertures for the BARs 132. The host 102 then allocates memory of the host device having the indicated memory aperture size, and writes the corresponding bits of the base address of that memory aperture to the highest non-"0" bits of the corresponding BAR 132. Afterwards, a complete reconfiguration of the PCIe hardblock 104 after the link training, without the operating system of the host 102 performing the link training again (e.g., by re-booting the host 102), can sever a communication link between the host 102 and the programmable logic device 100.

In some instances, the endpoint device 140 of an application or user design instantiated in a programmable logic region 106 can change or can utilize, at different times, different amounts of memory addressed by BARs 132. When this occurs, the host 102 can be aware of any change, and can write information (indicating, e.g., a memory aperture size, whether a BAR 132 is to be enabled, and an address bit size for a BAR 132 for the endpoint device 140) to the PCIe extended configuration space 134 (e.g., to the resizable BAR extended capabilities registers 200) of the PCIe configuration space 130. The information is apparent at the PCIe extended configuration space interface 128 and is polled and read by the dynamic BAR module 142. The dynamic BAR module 142 can write "0" to address bits of a BAR 132 to indicate a memory aperture size, can disable a BAR 132 by writing "0" to each address bit of a BAR 132, and/or change an address bit size of a BAR 132. The host 102 can then perform an enumeration process again to reallocate memory for a BAR 132 and write the corresponding base address to the BAR 132. The writing to a BAR 132 by the dynamic BAR module 142 and host 102 can be performed without reconfiguring a remainder of the PCIe hardblock 104 and, hence, can be performed without severing a communication link between the host 102 and the programmable logic device 100.

In some examples, a reconfiguration of a BAR 132 is triggered by a partial reconfiguration of the programmable logic device 100. The boot image file stored in the flash memory 160 may have a subsequent application or user design that contains a configuration for a subsequent endpoint device 140. In other examples, the host 102 can communicate a subsequent application or user design that contains a configuration for a subsequent endpoint device 140 to the programmable logic device 100, which stores the application or user design in the RAM 162 and/or RAM 154. An event on the programmable logic device 100 or the host 102 can trigger a partial reconfiguration of the programmable logic device 100. Handshaking may occur between the host 102 and the programmable logic device 100 upon the occurrence of the event and the programmable logic device initiating the partial reconfiguration.

As at least part of the partial reconfiguration, configuration data (e.g., a bitstream) can be transmitted to the programmable logic region 106 from the PMC 150 via the configuration interconnect 114 (e.g., a CFRAME interconnect) to instantiate the subsequent endpoint device 140 on the programmable logic region 106. Instantiating the subsequent endpoint device 140 can overwrite, at least partially, the initial endpoint device. In some examples, the partial reconfiguration executed by the PMC 150 generally does not reconfigure the PCIe hardblock 104 and does not overwrite or disable the dynamic BAR module 142 in the programmable logic region.

Once instantiated, the subsequent endpoint device 140 communicates an identification of the subsequent endpoint device 140 to the host 102 (e.g., via the previously configured PCIe communication link). Based on the identification, the host 102 determines one or more memory aperture sizes for respective BARs 132, whether to enable or disable one or more BARs 132, and/or a memory address bit size for one or more BARs 132 for the subsequent endpoint device 140. The host 102 then writes information indicating the memory aperture size(s), memory address bit size(s), and/or enable/disable to the PCIe extended configuration space 134 (e.g., to the resizable BAR extended capabilities registers 200) of the PCIe configuration space 130.

The information written to the PCIe extended configuration space 134 (e.g., to the resizable BAR extended capabilities registers 200) of the PCIe configuration space 130 is apparent at the PCIe extended configuration space interface 128 and is polled and read by the dynamic BAR module 142. Based on the information read via the PCIe extended configuration space interface 128, the dynamic BAR module 142 can write values to one or more BARs 132 to indicate a memory aperture size, to enable or disable one or more BARs 132, and/or change an address bit size of one or more BARs 132. The host 102 can then perform an enumeration process again to reallocate memory for a BAR 132 and write the corresponding base address to the BAR 132.

Some examples are provided to illustrate some operations of the dynamic BAR module 142. Variations of these described examples may be readily understood by a person having ordinary skill in the art and are contemplated within the scope of other examples.

Figure 3:
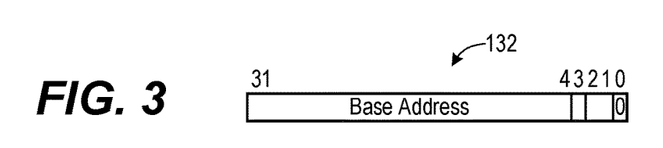
FIG. 3 depicts a base address register (BAR) to illustrate some aspects of operation of the programmable logic device of FIG. 1 according to some examples.

FIG. 3 illustrates a BAR 132 to illustrate some aspects of the operation of the programmable logic device 100 according to some examples. The BAR 132 can include control or non-address bits, such as a BAR type, address bit size, and prefetchable bits. The BAR 132 in FIG. 3 is indicated as a memory type by bit[0] being written as a "0". Aspects described herein may apply to other types, such as an input/output type. The PMC 150 in an initial configuration and the dynamic BAR module 142 in a subsequent reconfiguration are configured to write to the BAR 132. The PMC 150 and dynamic BAR module 142 write to the BAR 132 to indicate the BAR type (e.g., at bit[0]), the address bit size (e.g., at bit[2:1]) when the BAR type is memory, whether the BAR is prefetchable (e.g., at bit[3]) when the BAR type is memory, and the memory aperture size for remaining address bits.

Two BARs 132 can be concatenated as a single BAR 132 based on the address bit size. For example, assuming each BAR 132 to be 32-bits, if bit[2:1] of BAR 0 132 indicate a 64-bit address bit size as written by the PMC 150 or dynamic BAR module 142, BAR 0 132 and BAR 1 132 can be concatenated to form a single BAR 132, where BAR 0 132 can indicate a lower 32-bits of the memory address, and BAR 1 132 can indicate an upper 32-bits of the memory address. Other BARs 132 can also be concatenated, as a person having ordinary skill in the art will readily understand.

The PMC 150 and dynamic BAR module 142 each can write to address bits of a BAR 132 to indicate a memory aperture size. According to the PCIe base specification, a memory aperture size is some exponent of two (e.g., $2^i$, where i is (i) greater than or equal to 5 and (ii) equal to or less than 31 for a 32-bit address bit size, or 63 for a 64-bit address bit size). In some examples, the value written to address bits of a BAR 132 to indicate a memory aperture size is "0" to the k-th bit, where inverting the "0"s to respective "1"s from bit[0] to bit[k] and adding one is the memory aperture size. In some examples, the PMC 150 and dynamic BAR module 142 may write a "0" to each of the address bits of a BAR 132 to indicate that the BAR 132 is disabled.

After the PMC 150 or dynamic BAR module 142 write appropriate values to the BARs 132, the host 102 attempts to write "1"s to bits of the BARs 132. The PCIe hardblock 104 is configured to prevent the host 102 from writing to control bits of the BARs 132. For example, the PCIe hardblock 104 prevents the host 102 from overwriting the BAR type (e.g., at bit[0]), the address bit size (e.g., at bit[2:1]) when the BAR type is memory, and whether the BAR is prefetchable (e.g., at bit[3]) when the BAR type is memory. Additionally, the PCIe hardblock 104 is configured to prevent the host 102 from writing to address bits where a "0" was written (e.g., by the PMC 150 or dynamic BAR module 142). The PCIe hardblock 104 is configured to allow the host 102 to write "1"s to other bits of the BARs 132. The host 102 then reads the BARs 132. The host 102 can process the read values based on values of control bits read from the BARs 132. For example, if bit[0] of a BAR 132 indicates a memory type, the host 102 can process the read value of that BAR 132 to exclude or clear the lower four bits of the read value when determining a memory aperture size. Additionally, for example, if bit[2:1] of a BAR 132 indicate a 64-bit address bit size, the host 102 can process the read value of that BAR 132 to exclude or clear the lower four bits of that BAR 132 and to include the read value of the subsequent BAR 132 as included in the address bits. To determine a memory aperture size, the host 102 clears or sets to "0" any control bits in the read value of a BAR 132, inverts the read value (with cleared bits), and adds one to the inverted value. The result is the memory aperture size. The host 102 then allocates a memory aperture in memory having the memory aperture size and writes the base address of the memory aperture to the non-"0" address bits of the BAR 132.

As an example, assume BAR 0 132 is to be a memory type, have a 32-bit address bit size, and have a 4 KiB memory aperture size. For the BAR 132 to be a memory type and have a 32-bit address bit size, the PMC 150 or dynamic BAR module 142 writes "000" for bit[2:0] of the BAR 132. The PMC 150 or dynamic BAR module 142 can write any appropriate value to bit[3] for the prefetchable indication. The PMC 150 or dynamic BAR module 142 writes a "0" to each bit of bit[11:5]. Then, the host 102 attempts write a "1" to the bits of the BAR 132. The PCIe hardblock 104 prevents bit[11:0] from being overwritten (e.g., since bit[4:0] are control bits and bit[11:5] were written with "0" s). The host 102 therefore writes a "1" to each of bit[31:12] of the BAR 132. The host 102 then reads the value of the BAR 132, which is 0xffff00X (where "X" indicates the control bits). The host 102 clears the control bits and sets them to "0" in the read value, which results in 0xffff000. This value is inverted, and one is added to the inverted value, which results in 0x1000=4 KiB. More simply, the lowest-bit of the address bits of the read value that is "1" indicates the memory aperture size. The host 102 allocates a memory aperture having the 4 KiB memory aperture size and where the base address of the memory aperture has "0"s for bit[11:0] (e.g., corresponding to the un-writeable bit[11:0] of the BAR 132). The host 102 then writes the base address of the memory aperture to the BAR 132, where the address bits previously written with "0" and control bits are not overwritten.

As another example, assume BAR 0 132 is to be disabled. The PMC 150 or dynamic BAR module 142 can write "000" for bit[3:0] of the BAR 132. The PMC 150 or dynamic BAR module 142 writes "0"s to bit[32:5]. After the host 102 attempts to write to the BAR 132 and reads the value of the BAR 132, the host 102 determines a 0 B memory aperture size following the processed described above. For example, the read value is 0x0X; with the clearing of control bits, the resulting value is 0x0; 0x0 is inverted and one is added to obtain 0x0 (e.g., with the overflow being disregarded).

The dynamic BAR module 142 is configured to write to one or more of the BARs 132 based on information written to the resizable BAR extended capabilities registers 200. As indicated above, the format of the resizable BAR capabilities registers 204 and resizable BAR control registers 206 can vary. In some examples, a resizable BAR control register 206 includes bits that indicate which BAR 132 is identified for being controlled or rewritten. For example, bit[2:0] can identify the BAR 132 (e.g., bit[2:0]="000" can identify BAR 0 132; bit[2:0]="001" can identify BAR 1 132; ... bit[2:0]="101" can identify BAR 5 132). In other examples, the architecture of the resizable BAR control registers 206 can indicate which BAR 132 is identified for being controlled or rewritten (e.g., resizable BAR control register (j) 206 can identify BAR j 132). The resizable BAR control register 206 can include a bit that indicates whether the identified BAR 132 is enabled or disabled. For example, bit[3] can indicate whether the identified BAR 132 is enabled (e.g., bit[3]="0" can indicate that the BAR 132 is disabled, and bit[3]="1" can indicate that the BAR 132 is enabled). If the BAR 132 is indicated as to be disabled, other bits of the resizable BAR control register 206 and corresponding resizable BAR capabilities register 204 can be in a do not care or "X" state. In other examples, whether the identified BAR 132 is enabled is indicated by an indicated memory aperture size (described below). For example, if the indicated memory aperture size is zero, then the identified BAR 132 is to be disabled. Other bits of the resizable BAR control register 206 can indicate the BAR type (e.g., corresponding to the PCIe base specification). When the BAR type is memory, bits of the resizable BAR control register 206 can indicate the address bit size. For example, bit[6:5] can indicate the address bit size (e.g., bit[6:5]="00" indicates a 32-bit address bit size, and bit[6:5]="10" indicates a 64-bit address bit size). The resizable BAR capabilities register 204 corresponding to the resizable BAR control register 206 indicates a memory aperture size for the identified BAR. For example, the resizable BAR control register 206 can be written with data that is to be written to the identified BAR 132 for the memory aperture size, or can be written with encoded data that is decoded to indicate data that is to be written to the identified BAR 132 for the memory aperture size.

As stated previously, the host 102 can write information to one or more of the resizable BAR capabilities registers 204 and resizable BAR control registers 206 to indicate one or more memory aperture sizes for respective BARs 132, whether to enable or disable one or more BARs 132, and/or a memory address bit size for one or more BARs 132 for the subsequent endpoint device 140. The information written to the resizable BAR capabilities registers 204 and resizable BAR control registers 206 is polled and read by the dynamic BAR module 142. Based on the information read via the PCIe extended configuration space interface 128, the dynamic BAR module 142 can write information to one or more BARs 132 to indicate a memory aperture size, to enable or disable one or more BARs 132, and/or change an address bit size of one or more BARs 132 according to the example procedures described above. The dynamic BAR module 142 can write information that is read from the resizable BAR capabilities registers 204 and resizable BAR control registers 206 to respective BARs 132 and/or can include logic to decode information read from the resizable BAR capabilities registers 204 and resizable BAR control registers 206 to write corresponding information to respective BARs 132. The host 102 can then perform an enumeration process again to reallocate memory for a BAR 132 and write the corresponding base address to the BAR 132 according to the example procedures described above.

Figure 4:
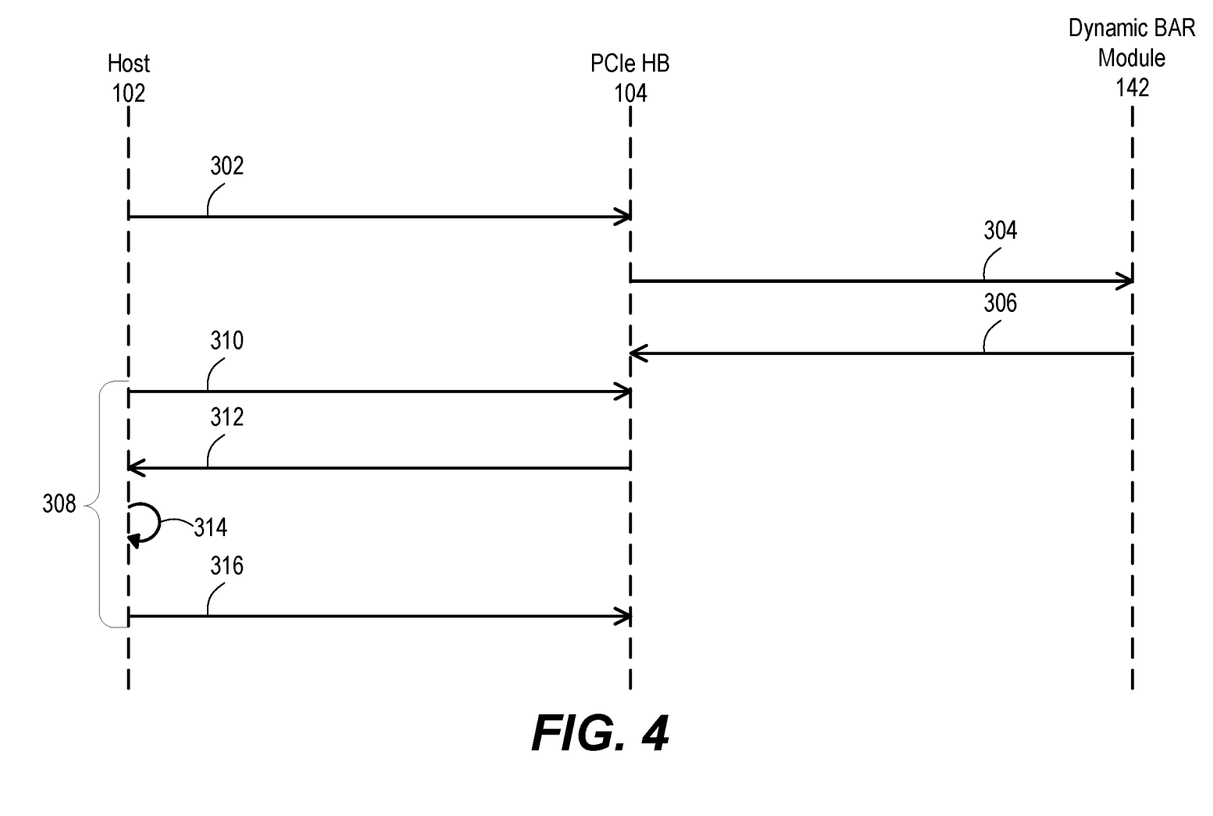
FIG. 4 is a process flow for dynamically reconfiguring a BAR according to some examples.

FIG. 4 illustrates a process flow for dynamically reconfiguring a BAR according to some examples. The process flow is described in the context of the PCIe environment of FIG. 1. The process flow assumes that a PCIe communication link has been established between the host 102 and an endpoint device 140. For example, in an initial configuration, the PCIe hardblock 104 can be configured, link training can occur, and an enumeration process can be performed as previously described.

The process flow can be initiated by any number of events. For example, the endpoint device 140 may have a change in utilization of memory such that the host 102 may increase or decrease a memory aperture size of one or more BARs 132, disable or enable one or more BARs 132, change an address bit size of one or more BARs 132, or any combination thereof. In examples with a programmable logic device 100, an initial endpoint device 140 (e.g., instantiated as part of an initial configuration) may be removed or overwritten, and a subsequent endpoint device 140 may be instantiated (e.g., as part of a partial reconfiguration). In examples in which a partial reconfiguration occurs, the host 102 can initiate the partial reconfiguration, or the programmable logic device 100 can initiate the partial reconfiguration. If the programmable logic device 100 initiates the partial reconfiguration, the initial endpoint device 140 can transmit an interrupt message to the host 102, and the partial reconfiguration can begin after a handshake protocol occurs. After the partial reconfiguration (regardless of initiation), the host 102 can request an identification of the subsequent endpoint device 140, and the subsequent endpoint device 140 can transmit the identification of the subsequent endpoint device 140 to the host 102 via the previously established PCIe communication link. The host 102 can then determine a memory aperture size of one or more BARs 132, whether to disable or enable one or more BARs 132, whether to change an address bit size of one or more BARs 132, or any combination thereof. If any change is determined to be made by the host 102, the process flow is initiated.

At operation 302, information relating to one or more BARs 132 is written to the PCIe extended configuration space 134 (e.g., the resizable BAR extended capabilities registers 200, and more particularly, the resizable BAR capabilities registers 204 and/or resizable BAR control registers 206) by the host 102. The information corresponds to a memory aperture size of the one or more BARs 132, whether to disable or enable the one or more BARs 132, whether to change an address bit size of the one or more BARs 132, or any combination thereof. The information that is written can be based on the identification of the endpoint device 140 and/or any change in utilization of memory. The written information can be in the format described above as an example.

At operation 304, the dynamic BAR module 142 polls the PCIe extended configuration space interface 128 and responsively determines whether information written to the PCIe extended configuration space 134 (e.g., the resizable BAR extended capabilities registers 200, and more particularly, the resizable BAR capabilities registers 204 and/or resizable BAR control registers 206) has changed. Further, at operation 304, the dynamic BAR module 142 reads information written to the PCIe extended configuration space 134 (e.g., the resizable BAR extended capabilities registers 200, and more particularly, the resizable BAR capabilities registers 204 and/or resizable BAR control registers 206) when any change is indicated.

At operation 306, the dynamic BAR module 142 writes respective values to bits of one or more BARs 132 based on the information read from the PCIe extended configuration space 134 at operation 304. The dynamic BAR module 142 can write information read from the PCIe extended configuration space 134 to one or more BARs 132 and/or can decode information read from the PCIe extended configuration space 134 to generate decoded information that is written to one or more BARs 132. The writing by the dynamic BAR module 142 can effectuate a number of possible permutations of possible changes.

In some examples, the dynamic BAR module 142 can write to one or more control bits (e.g., bit[2:1]) of one or more BARs 132 to concatenate or de-concatenate pairs of BARs 132. Assuming each of the BARs 132 is 32 bits and using BAR 0 132 and BAR 1 132 as an example, BAR 0 132 could be initially configured to not be concatenated with BAR 1 132 (e.g., bit[2:1] of BAR 0 132 is initially "00"). The information read from the PCIe extended configuration space 134 can indicate that BAR 0 132 and BAR 1 132 are to be concatenated, and the dynamic BAR module 142 writes to bit[2:1] of BAR 0 132 to concatenate BAR 0 132 and BAR 1 132. For example, the dynamic BAR module 142 writes "10" to bit[2:1] of BAR 0 132. Similarly, BAR 0 132 could be initially configured to be concatenated with BAR 1 132 (e.g., bit[2:1] of BAR 0 132 is initially "10"). The information read from the PCIe extended configuration space 134 can indicate that BAR 0 132 and BAR 1 132 are to be not concatenated, and the dynamic BAR module 142 writes to bit[2:1] of BAR 0 132 to de-concatenate BAR 0 132 and BAR 1 132. For example, the dynamic BAR module 142 writes "00" to bit[2:1] of BAR 0 132.

In some examples, the dynamic BAR module 142 can write a predefined value (e.g., "0") to a number of address bits of one or more BARs 132 to indicate a memory aperture size of the respective BAR 132. The dynamic BAR module 142 can write a predefined value (e.g., "0") to a number of bits of a BAR 132 to indicate a memory aperture size according to the procedure described above. The writing of a predefined value (e.g., "0") to address bits can accommodate an un-concatenated BAR 132 and concatenated BARs 132. Hence, the writing of a predefined value (e.g., "0") to address bits of a BAR 132 can be based on what is written or is to be written to bit[2:1] of the BAR 132. As an example, if bit[2:1] of BAR 0 132 is or is to be written to be "00" indicating a 32-bit address bit size, the dynamic BAR module 142 can write a "0" to any appropriate address bits in the range bit[31:5] of the BAR 0 132. As another example, if bit[2:1] of BAR 0 132 is or is to be written to be "10" indicating a 64-bit address bit size, the dynamic BAR module 142 can write a "0" to any appropriate address bits in the range bit[31:5] of the BAR 0 132 and bit[31:0] of BAR 1 132.

In some examples, the dynamic BAR module 142 can write a predefined value (e.g., "0") to each of the bits (e.g., including to each of the address bits) of one or more BARs 132 to disable the respective BAR 132. The dynamic BAR module 142 can write a predefined value (e.g., "0") to each of the bits of a BAR 132 to disable the BAR 132 according to the procedure described above. Writing a predefined value (e.g., "0") to each bit of a BAR 132 will be interpreted by a host 102 as requesting a memory aperture size of zero, which disables the BAR 132.

As would be readily understood by a person having ordinary skill in the art, writing to a BAR 132 to change an aspect of that BAR 132 may cause another aspect to be changed. For example, changing a BAR 132 to be concatenated with another BAR 132 may cause the memory aperture size to be written to the concatenated BARs 132. Other changes can similarly be affected.

At operation 308, the host 102 performs a re-enumeration process. The re-enumeration process includes, at operation 310, the host 102 attempting to write a set value (e.g., "1") to each address bit of one or more of the BARs 132. The PCIe hardblock 104 prevents the host 102 from writing the set value (e.g., "1") to any address bit of any BAR 132 previously written or set to be a predefined value (e.g., "0") and from writing to any control bit of any BAR 132. The re-enumeration process includes, at operation 312, the host 102 reading respective values of bits of the one or more of the BARs 132. At operation 314, the host 102 determines respective memory aperture sizes of the BARs 132, allocates memory apertures according to the determined memory aperture sizes, and identifies respective base addresses of the allocated memory. The host 102 determines a memory aperture size of a BAR 132 or concatenated BARs 132, e.g., by setting control bits to zero, inverting each bit of the resulting value, and adding one to the inverted value, as described above. The host 102 may release any memory aperture, e.g., that was previously allocated and not able to be re-allocated. The re-enumeration process further includes, at operation 316, the host 102 writing the base address of memory allocated for a BAR 132 into the respective BAR 132.

The above-described process flow can dynamically change one or more BARs of a PCIe hardblock. The change can be based on a change of endpoint device communicating through a PCIe communication link and/or a change of memory utilization of an endpoint device. Accordingly, although the endpoint device has been described herein as instantiated on a programmable logic region, the endpoint device can be or include any one or combination of a hardened IP block, an IP block instantiated on a programmable logic region, and an IP block that is a software module executed by a processor. The change to one or more BARs can be dynamically implemented without severing a PCIe communication link, which, if severed, could necessitate link training that is generally performed during a boot sequence of a host.

The dynamic BAR module can be embodied or implemented in a number of different ways according to various examples. The dynamic BAR module can be implemented as a hardened IP block, as an IP block instantiated on a programmable logic region, or as an IP block that is a software module executed by a processor. When the dynamic BAR module is to be implemented by a hardened IP block, various examples contemplate that a representation of the dynamic BAR module can be embodied on a non-transitory computer-readable storage medium. For example, the representation can be embodied as a computer-aided design (CAD) file with a layout of a circuit of the hardened IP block of the dynamic BAR module, can be a netlist of a circuit of the hardened IP block of the dynamic BAR module, or the like.

When the dynamic BAR module is to be implemented by an IP block instantiated on a programmable logic region, a representation of the dynamic BAR module can be embodied on a non-transitory storage medium. The representation can be embodied on the non-transitory storage medium alone or with, e.g., a user design in which the dynamic BAR module is incorporated. For example, a user can create a user design using a software design tool. An example software design tool is the Vivado® Design Suite available from Xilinx, Inc. of San Jose, Calif. The software design tool can permit the user to create a design using a hardware description language (HDL), register transfer language (RTL), high-level synthesis (HLS) models, concurrent programming language (e.g., SystemC), or the like. The software design tool can also permit the user to create a design using primitives (e.g., representative of hardware circuit components) that are user defined and/or defined by the software design tool. The primitives can be connected by the user to implement a circuit schematic in the design. The software design tool can compile the user design into a file (e.g., boot image file) that includes one or more bitstreams and/or binaries that are capable of being loaded onto the programmable logic device and executed by one or more subsystems of the programmable logic device. For example, a bitstream can be loaded into a programmable logic region to configure the programmable logic region, and binaries can be loaded into memory of a processing system for execution by a processor of the processing system. The programmable logic device, when loaded with the file and configured according to the file, can implement the user design, e.g., as in FIG. 1.

A supplier of the programmable logic device and/or the supplier of the software design tool can provide one or more IP blocks, including the dynamic BAR module, to the user for the user to incorporate, with or without modification, into the user design. For example, the IP blocks can be packaged with the software design tool, which may be provided in a memory (e.g., a compact disc read only memory (CD-ROM)) supplied to the user, or which may be downloaded via a network (e.g., the Internet) from a memory, such as a server or database. Additionally, IP blocks can be provided separate from the software design tool, and may be provided by a third-party. In such situations, IP blocks can be provided in a non-transitory storage medium (e.g., memory, such as a CD-ROM) supplied to the user, and/or may be downloaded via a network (e.g., the Internet) from a a non-transitory storage medium, such as memory in a server or database. IP blocks can be provided using a number of delivery mechanisms. IP blocks can be a file (e.g., stored in memory) that include, e.g., HDL, RTL, a HLS model, a concurrent programming language, a definition of one or more primitives, or a combination thereof.

A user can be provided access to the IP block, including a representation of the dynamic BAR module, stored in a non-transitory storage medium. The user can incorporate the IP block into a user design with or without modification to the IP block. Further, some examples can be embodied as a file (e.g., a boot image file) that includes one or more bitstreams and/or binaries that is stored in a non-transitory storage medium and is capable of being loaded onto and executed by the programmable logic device. For example, the file can be a result of compiling and/or synthesizing a user design including the design of FIG. 1. Even further, some examples can be embodied as a configured or programmed programmable logic device. For example, a file can be loaded onto the programmable logic device to program and/or configure the programmable logic device to implement the design of FIG. 1.

When the dynamic BAR module is to be implemented by an IP block that is a software module executed by a processor, a representation of the dynamic BAR module can be embodied on a non-transitory storage medium. The representation can be embodied on the non-transitory storage medium alone or with, e.g., a user design in which the dynamic BAR module is incorporated. The representation can be software code that is capable of being compiled or is compiled into executable instructions. A supplier of a device on which the dynamic BAR module is to be implemented and/or the supplier of the software design tool can provide one or more IP blocks, including the dynamic BAR module, to the user for the user to incorporate, with or without modification, into a software application. For example, the IP blocks can be packaged with a software design tool, which may be provided in a memory (e.g., a compact disc read only memory (CD-ROM)) supplied to the user, or which may be downloaded via a network (e.g., the Internet) from a memory, such as a server or database. Additionally, IP blocks can be provided separate from the software design tool, and may be provided by a third-party. In such situations, IP blocks can be provided in a memory (e.g., a CD-ROM) supplied to the user, and/or may be downloaded via a network (e.g., the Internet) from a memory, such as a server or database. IP blocks can be provided using a number of delivery mechanisms. IP blocks can be a file (e.g., stored in memory) that include, e.g., software written in C, C++, Java, Python, or other programming languages.

A user can be provided access to the IP block, including a representation of the dynamic BAR module, stored in a non-transitory storage medium. The user can incorporate the IP block into a software application with or without modification to the IP block. Further, some examples can be embodied as an executable file that is stored in a non-transitory storage medium and is capable of being loaded onto and executed by a device. Even further, some examples can be embodied as a configured or programmed device.

Examples of non-transitory storage mediums (e.g., memory) include RAM (e.g., static RAM (SRAM) and dynamic RAM (DRAM)), read only memory (ROM), programmable ROM (PROM), erasable programmable ROM (EPROM), electrically erasable programmable ROM (EEPROM), flash, NAND memory, CD-ROM, an optical storage device, a magnetic storage device, etc. The non-transitory storage medium, in some examples, can be standalone memory, can be included in any computing system (e.g., a desktop computer, a laptop computer, a server, a database, etc.) and/or can be memory disposed on a same board or in a same package or chip as a device to implement a user design or software application.

Figure 5:
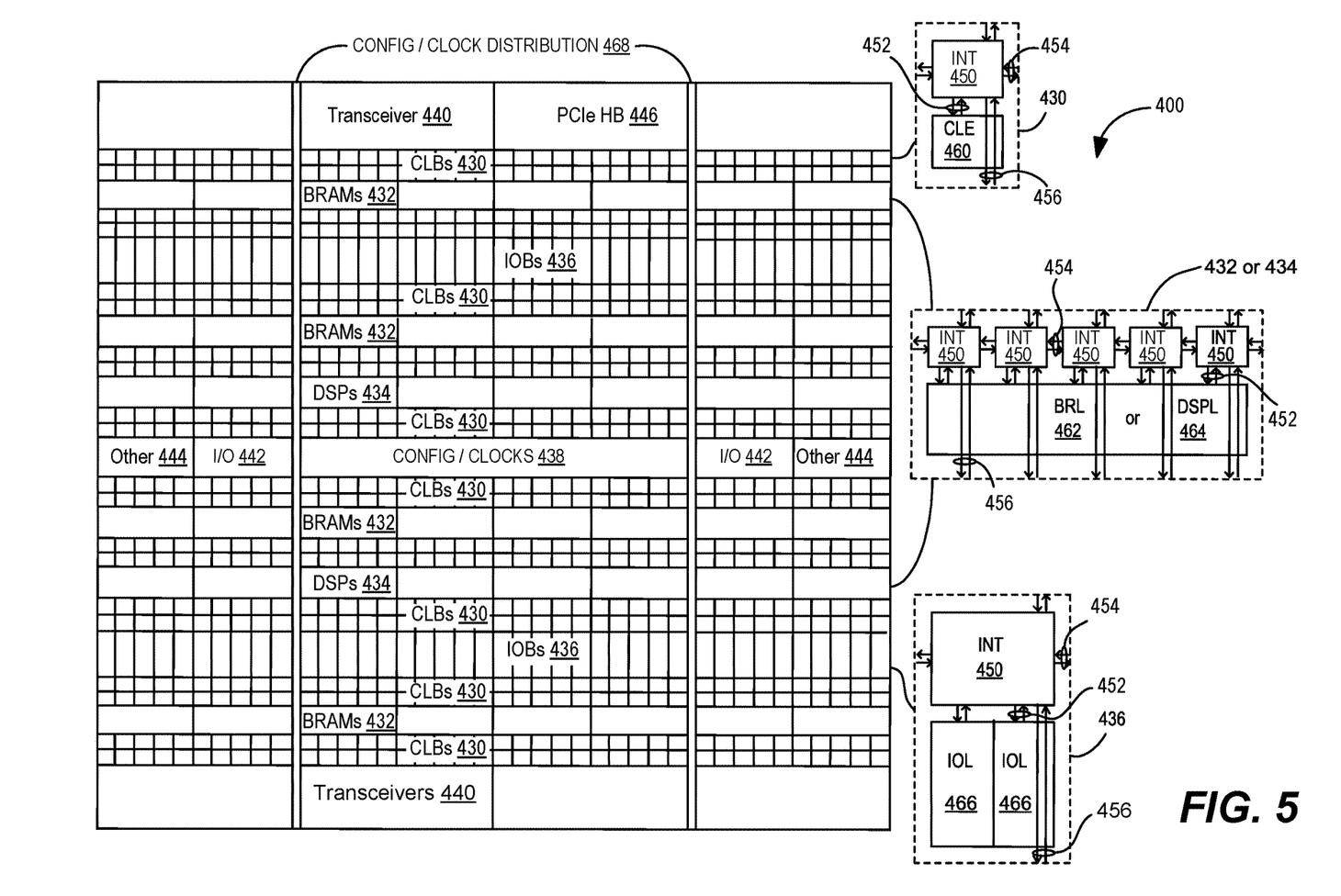
FIG. 5 illustrates a field programmable gate array (FPGA) that may be implemented as the programmable logic device of FIG. 1 according to some examples.

FIG. 5 illustrates a FPGA 400 that may be implemented as the programmable logic device 100 according to some examples. The FPGA 400 includes a large number of different programmable tiles (e.g., that form a programmable fabric) including configurable logic blocks ("CLBs") 430, random access memory blocks ("BRAMs") 432, signal processing blocks ("DSPs") 434, input/output blocks ("IOBs") 436, configuration and clocking logic ("CONFIG/ CLOCKS") 438, digital transceivers 440, specialized input/ output blocks ("I/O") 442 (e.g., configuration ports and clock ports), and other programmable logic 444 such as digital clock managers, system monitoring logic, and so forth. The FPGA 400 also includes a PCIe hardblock 446.

In some FPGAs, each programmable tile can include at least one programmable interconnect element ("INT") 450 having connections to input and output terminals 452 of a programmable logic element within the same tile, as shown by examples included in FIG. 5. Each programmable interconnect element 450 can also include connections to interconnect segments 454 of adjacent programmable interconnect element(s) in the same tile or other tile(s). Each programmable interconnect element 450 can also include connections to interconnect segments 456 of general routing resources between logic blocks (not shown). The general routing resources can include routing channels between logic blocks (not shown) comprising tracks of interconnect segments (e.g., interconnect segments 456) and switch blocks (not shown) for connecting interconnect segments. The interconnect segments of the general routing resources (e.g., interconnect segments 456) can span one or more logic blocks. The programmable interconnect elements 450 taken together with the general routing resources implement a programmable interconnect structure ("programmable interconnect") for the illustrated FPGA 400.

In an example implementation, a CLB 430 can include a configurable logic element ("CLE") 460 that can be programmed to implement user logic plus a single programmable interconnect element ("INT") 450. A BRAM 432 can include a BRAM logic element ("BRL") 462 in addition to one or more programmable interconnect elements. Typically, the number of interconnect elements included in a tile depends on the height of the tile. In the pictured example, a BRAM tile has the same height as five CLBs, but other numbers (e.g., four) can also be used. A signal processing block 434 can include a DSP logic element ("DSPL") 464 in addition to an appropriate number of programmable interconnect elements. An IOB 436 can include, for example, two instances of an input/output logic element ("IOL") 466 in addition to one instance of the programmable interconnect element 450. As will be clear to those of skill in the art, the actual I/O pads connected, for example, to the input/output logic element 466 typically are not confined to the area of the input/output logic element 466.

In the pictured example, a horizontal area near the center of the die is used for configuration, clock, and other control logic. Vertical columns 468 extending from this horizontal area or column are used to distribute the clocks and configuration signals across the breadth of the FPGA.

Some FPGAs utilizing the architecture illustrated in FIG. 5 include additional logic blocks that disrupt the regular columnar structure making up a large part of the FPGA. The additional logic blocks can be programmable blocks and/or dedicated logic.

Note that FIG. 5 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 5 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing is directed to specific examples, other and further examples may be devised without departing from the basic scope thereof, and the scope thereof is determined by the claims that follow.

What is claimed is:

1. A method for reconfiguring a Peripheral Component Interconnect Express (PCIe) communication environment, the method comprising:
    writing information relating to a base address register (BAR) of a PCIe configuration space to a PCIe extended configuration space of the PCIe configuration space;
    reading, by a dynamic BAR module, the information from the PCIe extended configuration space;
    writing, by the dynamic BAR module, respective values to bits of the BAR based on the information read by the dynamic BAR module;
    after writing by the dynamic BAR module, attempting to write a set value to each of address bits of the BAR, wherein writing the set value to a respective address bit of the BAR is prevented when the respective address bit is set to a predefined value;
    after attempting to write, reading a read value from the bits of the BAR; and
    writing a base address of memory to the BAR based on the read value.

2. The method of claim 1, wherein writing by the dynamic BAR module is performed after a link training procedure is performed to establish a PCIe communication link configured, at least in part, by the PCIe configuration space.

3. The method of claim 1, wherein the set value is a logical "1", and the predefined value is a logical "0".

4. The method of claim 1, wherein writing by the dynamic BAR module includes writing the predefined value to a number of the address bits of the BAR indicative of a memory aperture size.

5. The method of claim 1, wherein writing by the dynamic BAR module includes writing the predefined value to each bit of the address bits of the BAR disabling the BAR.

6. The method of claim 1, wherein writing by the dynamic BAR module includes writing one or more control bits of the BAR to concatenate or de-concatenate the BAR and a subsequent BAR.

7. The method of claim 1, wherein:
    a host performs writing the information to the PCIe extended configuration space, attempting to write the set value to each of the address bits of the BAR, reading the read value of the bits of the BAR, and writing the base address to the BAR; and
    further comprising:
        determining, by the host, a memory aperture size based on the read value; and
        allocating the memory for the BAR, the memory having the memory aperture size and the base address.

8. The method of claim 7, wherein:
    writing, by the dynamic BAR module, respective values to the bits of the BAR includes one or more of:
        writing a logical "0" to each of the address bits of the BAR when the information indicates that the BAR is to be disabled;
        writing a value to one or more control bits of the BAR indicating whether the BAR is concatenated with a subsequent BAR based on the information; and
        writing a logical "0" to a number of the address bits of the BAR indicating the memory aperture size for the BAR based on the information;
    attempting to write the set value to each of the address bits of the BAR includes attempting, by the host, to write a logical "1" to each of the address bits of the BAR, wherein writing a logical "1" to a respective address bit of the BAR is prevented when the respective address bit is set to a logical "0"; and
    determining the memory aperture size comprises:
        setting each bit of the read value corresponding to one of the one or more control bits of the BAR to a logical "0" to obtain an intermediate value;
        inverting each bit of the intermediate value; and
        adding one to the inverted intermediate value to obtain the memory aperture size.

9. The method of claim 1, wherein the PCIe configuration space is disposed in a PCIe hardblock, the PCIe hardblock and the dynamic BAR module being disposed on a programmable logic device.

10. A device for communicating in a Peripheral Component Interconnect Express (PCIe) environment, the device comprising:
    a PCIe configuration space comprising a base address register (BAR) and a PCIe extended configuration space; and
    a dynamic BAR module comprising logic configured to read information written to the PCIe extended configuration space and to write respective values to bits of the BAR in response to the read information.

11. The device of claim 10, wherein the PCIe extended configuration space includes one or more registers configured to be written by a host, the dynamic BAR module being configured to read the information by reading from the one or more registers.

12. The device of claim 10, wherein the read information includes:
    information indicating whether the BAR is to be disabled;
    information indicating whether the BAR is to be concatenated with a subsequent BAR when the BAR is to be enabled; and
    information indicating a memory aperture size for the BAR when the BAR is to be enabled.

13. The device of claim 10, wherein the dynamic BAR module is configured to:
    write a logical "0" to each of address bits of the BAR when the read information indicates that the BAR is to be disabled;
    write a value to one or more control bits of the BAR based on whether the read information indicates that the BAR is to be concatenated with a subsequent BAR when the BAR is to be enabled; and
    write a logical "0" to a number of the address bits of the BAR indicative of a memory aperture size of the BAR when the BAR is to be enabled.

14. The device of claim 10 further comprising a programmable logic region configurable to instantiate endpoint devices thereon, each of the endpoint devices being configured to communicate via a PCIe communication link configured according to the PCIe configuration space.

15. The device of claim 10, wherein the PCIe configuration space is disposed in a PCIe hardblock, and the dynamic BAR module is instantiated on a programmable logic region.

16. A non-transitory storage medium storing a representation of a dynamic base address register (BAR) module, the dynamic BAR module to be implemented on a programmable logic device, the dynamic BAR module comprising logic configured to:
    read information written to one or more registers of a Peripheral Component Interconnect Express (PCIe)

extended configuration space of a PCIe configuration space, the PCIe configuration space being in a PCIe hardblock; and write respective values to bits of a BAR of the PCIe configuration space in response to the read information.

17. The non-transitory storage medium of claim 16, wherein the read information includes:

information indicating whether the BAR is to be disabled;

information indicating whether the BAR is to be concatenated with a subsequent BAR when the BAR is to be enabled; and information indicating a memory aperture size for the BAR when the BAR is to be enabled.

18. The non-transitory storage medium of claim 16, wherein the logic is further configured to:

write a logical "0" to each of address bits of the BAR when the read information indicates that the BAR is to be disabled;

write a value to one or more control bits of the BAR based on whether the read information indicates that the BAR is to be concatenated with a subsequent BAR when the BAR is to be enabled; and write a logical "0" to a number of the address bits of the BAR indicative of a memory aperture size of the BAR when the BAR is to be enabled.

19. The non-transitory storage medium of claim 16, wherein the logic is further configured to poll an extended configuration space interface of the PCIe hardblock to determine when the information is written to the one or more registers.

20. The non-transitory storage medium of claim 16, wherein the dynamic BAR module to be implemented on a programmable logic region of the programmable logic device.

* * * * *